(12) United States Patent
Weinig et al.

(10) Patent No.: US 10,717,206 B2
(45) Date of Patent: Jul. 21, 2020

(54) POWER SAW SYSTEM AND CABLE ASSEMBLY FOR A POWER SAW

(71) Applicant: Andreas Stihl AG & Co. KG, Waiblingen (DE)

(72) Inventors: Markus Weinig, Winnenden (DE); Harald Mang, Winnenden (DE); Jonas Lank, Winnenden (DE); Georg Heinzelmann, Winnenden (DE); Martin Failenschmid, Gomadingen (DE); Benjamin Frey, Stuttgart (DE); Simon Jug, Fellbach (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 578 days.

(21) Appl. No.: 14/944,247

(22) Filed: Nov. 18, 2015

(65) Prior Publication Data
US 2016/0144530 A1 May 26, 2016

(30) Foreign Application Priority Data
Nov. 20, 2014 (EP) ..................................... 14003913

(51) Int. Cl.
*B25F 5/00* (2006.01)
*B23D 57/02* (2006.01)
(Continued)

(52) U.S. Cl.
CPC ......... *B27G 19/003* (2013.01); *B23D 57/023* (2013.01); *B25F 5/00* (2013.01);
(Continued)

(58) Field of Classification Search
CPC ........... H02G 15/007; B25F 5/00; B27B 5/29; H01R 13/5812; H01R 13/635; H01R 24/28; G01B 3/1071; B23D 57/023
(Continued)

(56) References Cited

U.S. PATENT DOCUMENTS 2,913,791 A * 11/1959 Martin ............... H01R 13/6395
24/136 R
4,558,495 A 12/1985 Olsen
(Continued)

FOREIGN PATENT DOCUMENTS

CN 101391424 3/2009
CN 101521364 9/2009
(Continued)

*Primary Examiner* — Jason Daniel Prone
*Assistant Examiner* — Samuel A Davies
(74) *Attorney, Agent, or Firm* — Gudrun E. Huckett (57) ABSTRACT

A power saw system has a power saw with housing; guide bar; and saw chain driven about the guide bar by an electric drive motor. A battery is arranged outside of the housing. A power cable is connected with its first end through an electrical connection to the battery and with the second end to the drive motor to supply the drive motor with power. An elastic securing element is connected by a fastening element to the housing. A connecting device connects by a mechanical connection the securing element to an operator of the power saw. The connecting device has an overload protection separating the mechanical connection between securing element and operator when a maximum pulling force is surpassed. Securing element and power cable form a cable assembly. A pull-out force for separating the electrical connection is smaller than the maximum pulling force.

19 Claims, 7 Drawing Sheets

(51) Int. Cl.
*B27B 17/02* (2006.01)
*H01R 24/28* (2011.01)
*B27G 19/00* (2006.01)
*H01R 13/635* (2006.01)

(52) U.S. Cl.
CPC ........... *B27B 17/02* (2013.01); *H01R 13/635* (2013.01); *H01R 24/28* (2013.01)

(58) Field of Classification Search
USPC .......... 439/180, 451, 460, 474, 475; 173/46; 24/115 F, 131 C, 136 R, 3.12, 3.13; 138/118.1, 121, 118; 30/383
See application file for complete search history.

(56) References Cited

U.S. PATENT DOCUMENTS

| | | | | |
|---|---|---|---|---|
| 4,667,460 A * | 5/1987 | Kramer | ................ | A01D 34/822 174/135 |
| 4,698,717 A * | 10/1987 | Scheid | .................... | H02G 7/18 307/119 |
| 5,394,592 A | 3/1995 | Quick | | |
| 5,711,055 A * | 1/1998 | Quick | ...................... | B25F 5/00 24/129 R |
| 6,299,040 B1 * | 10/2001 | Matias | ...................... | A45F 5/00 224/254 |
| 6,461,192 B1 * | 10/2002 | Kwoka | ................. | H01R 31/06 439/505 |
| 6,776,317 B1 * | 8/2004 | Parker | ....................... | A45F 5/00 224/250 |
| 7,592,544 B2 * | 9/2009 | Carscallen, II | ......... | B66F 9/122 138/118 |
| 8,136,256 B2 | 3/2012 | Wolf et al. | | |
| 2006/0261617 A1 * | 11/2006 | St. Germain | ............. | B66C 1/12 294/74 |
| 2007/0145087 A1 | 6/2007 | Mikesell et al. | | |
| 2008/0163464 A1 * | 7/2008 | Baumann | .................. | A45F 5/02 24/3.12 |
| 2009/0211807 A1 | 8/2009 | Kremsler | | |
| 2009/0266435 A1 * | 10/2009 | Ferrone | .................. | A01K 7/027 138/33 |
| 2011/0005088 A1 * | 1/2011 | Pellenc | ............... | B27B 17/0008 30/383 |
| 2011/0056723 A1 * | 3/2011 | Slippy | ................. | H01R 13/5808 174/73.1 |
| 2011/0269332 A1 * | 11/2011 | Kim | ................... | H01R 13/5841 439/470 |
| 2011/0315441 A1 * | 12/2011 | Balfour | .................... | H02G 7/04 174/40 R |
| 2012/0118595 A1 | 5/2012 | Pellenc | | |
| 2016/0374407 A1 * | 12/2016 | Yagerman | ................. | A45F 5/02 2/411 |

FOREIGN PATENT DOCUMENTS

DE          298 08 030 U1      9/1999
WO       2013/080233 A1     6/2013

\* cited by examiner

POWER SAW SYSTEM AND CABLE ASSEMBLY FOR A POWER SAW

BACKGROUND OF THE INVENTION

The invention relates to a power saw system comprising a power saw that comprises a housing and a guide bar secured to the housing, wherein the power saw comprises an electric drive motor driving the saw chain in circulation about the guide bar, wherein the drive motor is supplied with power by at least one battery, wherein the battery is arranged outside of the housing of the power saw and is connected by a power cable with the drive motor, wherein the power cable has a first end connected through an electrical connection with the battery and a second end secured on the power saw.

The invention further comprises a cable assembly for a power saw.

U.S. 2012/0118595 A1 discloses a power saw system comprising a power saw. A power cable is provided for connecting the power saw to an external battery.

In particular for working with in-tree power saws, elastic securing elements are known which are secured with one end to a carrying device such as a carrying belt or the like and are secured with the other end to the power saw. When climbing in the tree, the operator can suspend the power saw from the securing element which is also referred to as power saw sling. The securing element is usually attached to the carrying device of the operator by means of an overload protection. When the power saw gets hooked in branches, the securing element detaches from the operator.

The invention has the object to provide a power saw system of the aforementioned kind that enables, in particular when working in a tree, comfortable working and moving within the tree. A further object of the invention resides in providing a cable assembly for a power saw.

SUMMARY OF THE INVENTION

In accordance with the present invention, this is achieved in connection with the power saw system in that the power saw system comprises an elastic securing element, wherein the securing element is secured by at least one fastening means to the housing of the power saw, and wherein at least one connecting device for connecting the securing element with an operator is provided, wherein the connecting device has an overload protection that releases the mechanical connection between the securing element and the operator when a pulling force acting on the securing element surpasses a maximum pulling force, wherein the securing element and the power cable together form a cable assembly, and wherein the pull-out force for releasing the electrical connection is smaller than the maximum pulling force.

In regard to the cable assembly, the object is solved by a cable assembly comprising an elastic securing element and a power cable. The cable assembly comprises at least one fastening means with which the securing element is securable on the housing of a power saw and the cable assembly further comprises at least one connecting device for connecting the cable assembly to an operator, wherein the connecting device has an overload protection that releases the mechanical connection between the securing element and the operator when a pulling force acting on the securing element surpasses a maximum pulling force. The power cable comprises a plug of an electrical connection and the pull-out force of the electrical connection (force for separating the electrical connection) is smaller than the maximum pulling force.

An elastic securing element is provided for the power saw, and the elastic securing element and the power cable together define a cable assembly. The power cable is connected by an electrical connection to the battery. The elastic securing element is connected to the operator by a connecting device with an overload protection. The overload protection releases the mechanical connection with which the securing element is connected to the operator when a pulling force acting on the securing element surpasses the maximum pulling force of the overload protection. In order for the mechanical connection provided between the power saw and the battery by means of the power cable to be released also upon detachment of the elastic securing element, it is provided that the pull-out force for release of the electrical connection between the power cable and the battery is less than the maximum pulling force of the overload protection. When on the securing element a pulling force is acting that is greater than the maximum pulling force of the overload protection, the mechanical connection between securing element and operator is released. After release of this mechanical connection, the pulling force is acting on the electrical connection between the power cable and the battery. Accordingly, since the pull-out force for release of the electrical connection is smaller than the maximum pulling force, the electrical connection is released also so that the operator can move independent of the power saw.

In this context, the securing element is elastic in regard to its longitudinal direction, i.e., expandable. When the expansion force no longer acts on the securing element, the securing element will contract again until it has at least substantially reached its initial length.

The pull-out force of the electrical connection advantageously amounts to at most half, in particular at most one fifth, of the maximum pulling force. Accordingly, a secure detachment of the electrical connection is ensured after release of the mechanical connection effected by the overload protection.

In order to impair the operator as little as possible by the cable assembly when working with the power saw, it is provided that the cable assembly has means for connecting the power cable to the securing element. Advantageously, the power cable is attached to the securing element adjacent to the fastening means and/or adjacent to the connecting device. When the power cable is attached to the securing element adjacent to the connecting device, it is furthermore achieved that the force acting on the connecting device is acting immediately on the electrical connection after the maximum pulling force has been surpassed so that a safe release of the electrical connection is ensured in this way.

In order to enable a good adaptation to the operator and to the work to be performed, it is advantageously provided that the connecting device can be secured to the cable assembly in at least two positions. For this purpose, the connecting device is advantageously detachably attached to the cable assembly. Advantageously, the connecting device comprises a clamping device for providing a detachable connection to the cable assembly by means of which the connecting device can be secured in different positions on the cable assembly. The adjustable connecting device can be provided in addition to or as an alternative to the connecting device arranged at one end of the securing element.

In order to enable ease of working, it is provided that the power cable is loosely connected to the securing element across a connecting length that amounts to at least 50% of the length of the securing element that is measured between the fastening means and the connecting device. The connection between the power cable and the securing element is embodied such that the spacing between the securing element and the power cable in any area in which the lose connection is existing is less than 15 cm.

Preferably, power cable and securing element are loosely connected to each other across approximately the entire length of the securing element measured between fastening means and connecting device. A fixed connection of the power cable with the securing element can however be advantageous also. The length of the securing element refers in this context to the length of the securing element when it is in an unloaded state. A simple configuration results when the power cable in the area in which the power cable is connected to the securing element is wound about the securing element. Accordingly, in a simple way a length expansion of the cable assembly is enabled even when the power cable is not elastic.

A simple configuration results when the power cable in the area in which it is connected with the securing element is guided inside the securing element. In this configuration, the securing element can surround the power cable like a sleeve. However, it can also be provided that the power cable, in particular the individual leads of the power cable, are embedded in the material of the securing element. This is in particular advantageous when the securing element is comprised of plastic material and is embodied as a solid (massive) body or when the securing element is designed as a fabric that is at least partially tubular. However, it can also be provided that the cable assembly comprises a sheath in which the securing element and the power cable are guided across at least a portion of their length. In the sheath, the individual leads of the power cable can be guided without an enclosing cable jacket. Accordingly, the stiffness of the arrangement relative to an arrangement with cable jacket is reduced. Advantageously, the sheath is at least partially elastic in its length direction so that length changes of the cable assembly are not impaired by the sheath. However, it can also be provided that the sheath is folded or has a fabric structure that enables length changes. Advantageously, the sheath extends across at least 50% of the area of the cable assembly defined between the fastening means and the connecting device, preferably across at least 80% of the area, particularly preferred across approximately the entire area.

Expediently, the cable assembly has a length limitation device for limiting the maximum expanded length of the securing element. As soon as the securing element has reached its maximum expanded length, forces still acting on the securing element are no longer utilized for a further expansion of the securing element but act immediately on the overload protection. The maximum expanded length of the securing element between the fastening means and the connecting device advantageously amounts to at least 150%, in particular at least 160%, of the unloaded length of the securing element (length with no load applied to securing element) measured between the fastening means and the connecting device. Accordingly, a sufficiently large maximum expanded length of the securing element can be achieved and, at the same time, the unloaded length of the securing element is comparatively small so that the operator is not impaired by the unloaded securing element when working with the power saw. The length of the power cable corresponds advantageously at least to the maximum expanded length of the securing element. Accordingly, damage of the power cable by overexpansion is safely avoided.

The first end of the power cable carries advantageously a plug of a plug connection which is electrically connected to a counter plug of the plug connection associated with the battery. The plug connection is advantageously detachable in a pull-out direction. In order to ensure that the pull-out force acting on the power cable is acting in the pull-out direction of the plug connection and that the plug connection is released at the desired pull-out force, it is advantageously provided that the counter plug is secured so as to be movable to a limited extent and is able to align in the direction of the pull-out force acting on the power cable. The counter plug can be embodied in this context in particular on a power cable which is connected to the battery and is secured movably on the operator, for example, on a carrying device of the operator such as a carrying belt or the like, for example, in a fabric sling. Accordingly, in a simple way it can be achieved that the pull-out force is acting on the plug connection in the pull-out direction of the plug connection. In order to ensure that no forces are acting on the power cable, it is advantageously provided that the plug is connected fixedly with the length limitation device of the securing element. It can be provided that the overload protection is arranged on the plug connection, for example, on housing parts of the plug connection.

A cable assembly for a power saw according to the invention comprises an elastic securing element and a power cable, wherein the cable assembly comprises at least one fastening means with which the securing element can be secured on the housing of the power saw and wherein the cable assembly comprises at least one connecting device for connecting the cable assembly to an operator, wherein the connecting device comprises an overload protection that releases the mechanical connection between the securing element and the operator when a pulling force acting on the securing element surpasses a maximum pulling force, and wherein the power cable carries a plug of an electrical connection, wherein the pull-out force of the electrical connection is smaller than the maximum pulling force.

When working with a power saw, the cable assembly can be secured on the power saw and on the operator. When a force is acting on the power saw that is greater than the permissible maximum pulling force of the overload protection, the securing element as well as the electrical connection will release so that the cable assembly is detached completely from the operator.

Embodiments of the invention will be explained in the following with the aid of the drawings.

DESCRIPTION OF THE PREFERRED EMBODIMENTS

Figure 1:
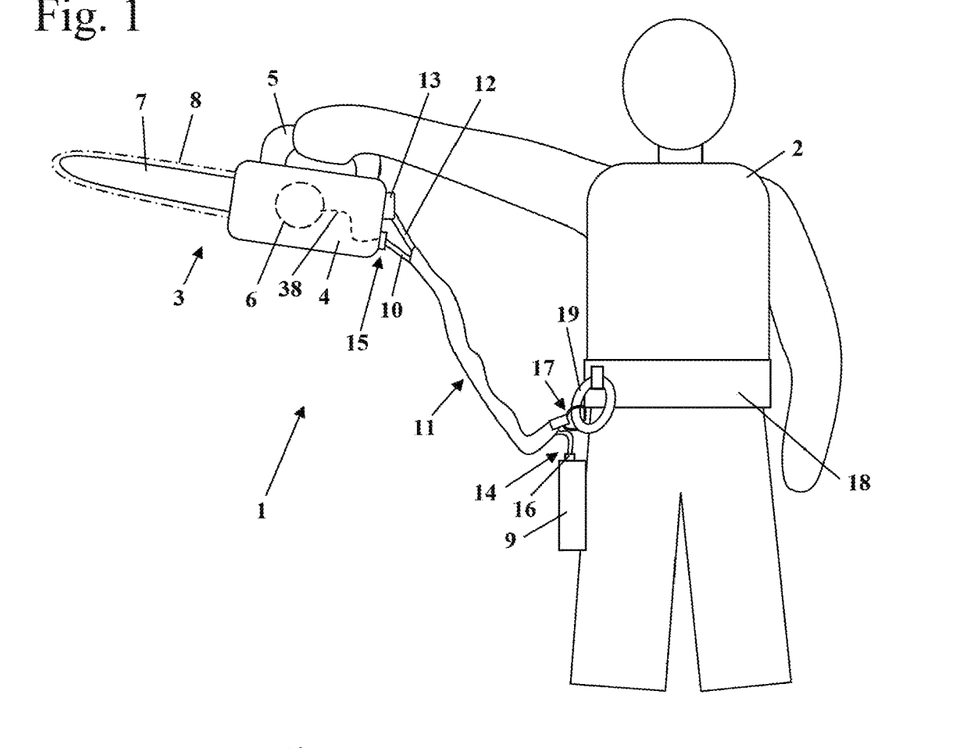
FIG. 1 is a schematic illustration of a power saw system carried by an operator.

FIG. 1 shows a power saw system 1 as an embodiment. The power saw system 1 comprises a power saw 3, a cable assembly 11 as well as a battery 9. The power saw 3 comprises a housing 4 on which a handle 5 is secured. The handle 5 is designed as a top handle. The power saw 3 is an in-tree power saw (also referred to as top handle saw). In the schematic illustration of FIG. 1, the power saw 3 is held by an operator 2 at the top handle 5. On the housing 4, a guide bar 7 is secured about which the saw chain 8 is guided. In operation, the saw chain 8 is driven in circulation about the guide bar 7 by a drive motor 6 arranged in the housing 4. The drive motor 6 is designed as an electric motor and is supplied with power by the battery 9 via a power cable 10 attached to the battery 9. The power cable 10 has a first end 14 that is connected by an electrical connection 16 with the battery 9. The electrical connection 16 can be provided immediately on the housing of the battery 9. However, it can also be provided that the battery 9 is connected by a connecting cable with the electrical connection 16 that is embodied, for example, as a plug connection. The second end 15 of the power cable 10 is secured on the housing 4 of the power saw 3. For this purpose, for example, a connecting part of a plug connection, for example, a socket, can be provided on the housing 4 of the power saw 3. It can also be provided that on the housing 4 a compartment for receiving a battery pack is provided and that an adapter is inserted into the compartment to which the second end 15 of the power cable 10 is connected. This connection can also be advantageously realized by a plug connection. In the housing 4, the second end 15 of the power cable is connected by an electrical connection 38 with the drive motor 6. The electrical connection 38 can be designed in any suitable way known to the artisan.

Particularly when working in a tree, it is advantageous to attach the power saw 3 by means of a securing element 12 to the operator 2. The securing element 12 is advantageously a securing cable or rope. The securing element 12 is advantageously designed to be elastic so that the securing element 12 is expandable (stretchable) in its length direction. When the operator 2 moves within the tree, the operator 2 can transport the power saw 3 by suspending it from the securing element 12 so that the power saw 3 is hanging from the securing element 12. Accordingly, the operator 2 has both hands free and is not impaired by the power saw 3 in his ability to move. The securing element 12 is attached by means of at least one fastening means 13 to the housing 4 of the power saw 3. The fastening means 13 can comprise, for example, a ring or the like which is hooked into an eye of the power saw 3. On the operator 2, the securing element 12 is secured by means of a connecting device 17. In the embodiment, the operator 2 carries a carrying belt 18 on which a carabiner 19 is secured. The connecting device 17, in the embodiment a ring, is hooked to the carabiner 19. When the power saw 3 is secured, for example, on a carrying belt 18, the securing element 12 is comparatively short. In operation, when the operator 2 holds the power saw 3, the securing element 12 can expand (lengthen) and enables in this way a great freedom of movement when working with the power saw 3. When the power saw 3 is transported suspended from the securing element 12, the securing element 12 can expand (lengthen) even further, in particular up to the point of reaching a maximum length.

The power cable 10 and the securing element 12 form a cable assembly 11. In this way, the operation is simplified. The power cable 10 and the securing element 12 are at least partially, in the embodiment about most of their length, connected to each other. In this way, it is substantially avoided that the operator 2 is impaired by the cable assembly 11.

Figure 2:
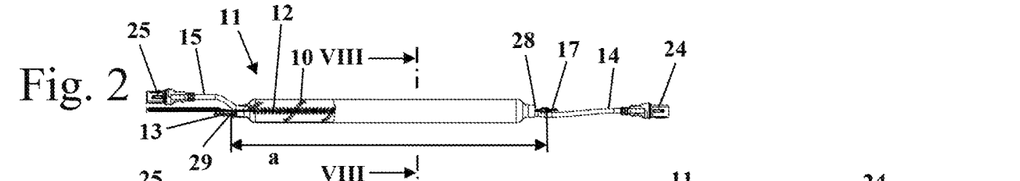
FIG. 2 is a partially sectioned view of the cable assembly of the power saw system of FIG. 1 in the unloaded state.

FIG. 2 shows the cable assembly 11 in the unloaded state. The securing element 12 comprises a first end section 28, on which the connecting device 17 is provided, as well as a second end section 29, on which a fastening means 13 is secured which is a ring in the embodiment. The securing element 12 has an unloaded length a that is measured from the first end section 28 to the second end section 29, i.e., from the connecting device 17 to the fastening means 13. The length a can be, for example, approximately 50 cm to approximately 1 m.

Figure 3:
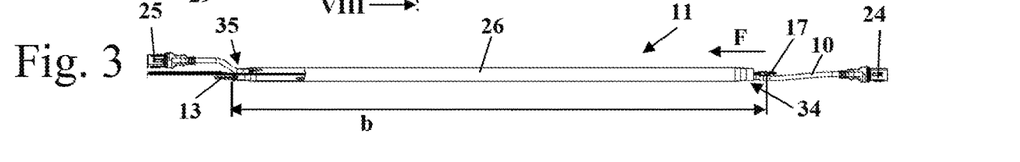
FIG. 3 is a partially sectioned view of the cable assembly of FIG. 2 in the completely expanded state.

FIG. 3 shows the cable assembly 11 in the completely expanded state. In this state, the cable assembly 11 has a length b measured between the fastening means 13 and the connecting device 17. The length b is significantly greater than the length a. The length b can be, for example, approximately 75 cm to approximately 1.6 m, in particular approximately 90 cm to approximately 1.4 m. The length b advantageously amounts to at least 150%, in particular at least 160%, of the unloaded length a. As is illustrated in FIGS. 2 and 3, at the first end 14 of the power cable 10 a first plug 24 of a plug connection is provided and at the second end 15 of the power cable 10 a second plug 25 is provided. The plugs 24 and 25 each form parts of plug connections for connecting the power cable 10 to the battery 9 or to the drive motor 6.

As is also shown in FIGS. 2 and 3, the power cable 10 and the securing element 12 are surrounded by an elastic sheath 26 across approximately the entire length from the first end section 28 to the second end section 29 of the securing element 12. The sheath 26 is connected in a first fastening area 34 and a second fastening area 35 to the power cable 10 and to the securing element 12. In this context, the sheath 26 connects the securing element 12 and the power cable 10 to each other in the first fastening area 34 and also in the second fastening area 35.

Figure 4:
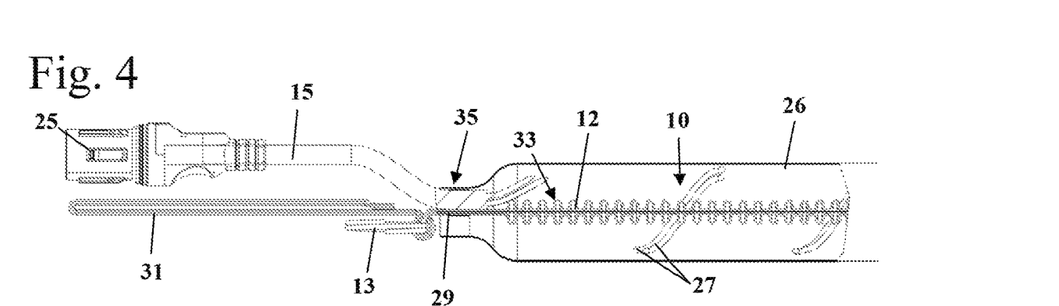
FIG. 4 is an enlarged detail view, partially in section, of the end of the cable assembly to be secured to the power saw.

As is shown in the enlarged illustration of FIG. 4, the power cable 10 of the embodiment has two leads 27 which are extending within the sheath 26 without an additional cable jacket. The leads 27 of the power cable 10 are wound loosely about the securing element 12 and can rest on the inner circumference of the sheath 26. The leads 27 serve advantageously for transmission of electrical energy. Advantageously, two further leads, not illustrated, are provided which serve as signal lines and are also wound loosely about the securing element 12. As is also shown in FIG. 4, the securing element 12 is provided adjacent to the fastening means 13 with a sling 31 which can also be used for attachment.

Figure 5:
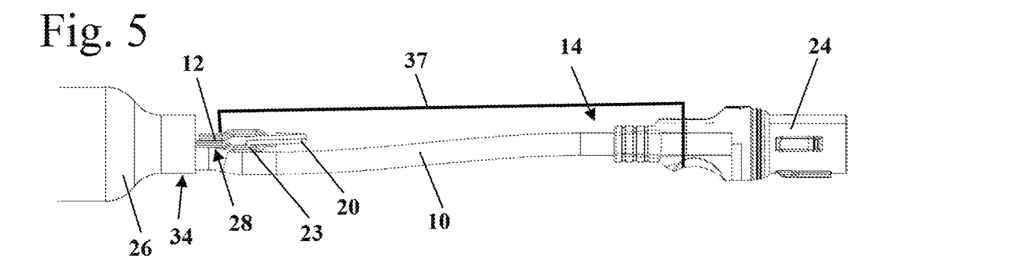
FIG. 5 is an enlarged illustration of the end of the cable assembly to be secured to the operator.

FIG. 5 shows the first fastening area 34 and the first end 14 of the power cable 10 in enlarged illustration. The securing element 12 comprises at its first end section 28 a loop 23 in which an overload ring 20 is hooked. The securing element 12 is connected by means of a connection 37 that is schematically illustrated in FIG. 5 with the first plug 24. The connection 37 can be bendable but does not expand in the longitudinal direction of the power cable 10 when exposed to forces usually acting on the securing element 12 during operation. Lengthening of the connection 37 occurs advantageously only when forces that are greater than the pull-out force of the electrical connection 16 are acting on it. The connection 37 can be formed, for example, by a cable jacket that is arranged about the leads 27 and advantageously also about the signal lines.

Figure 6:
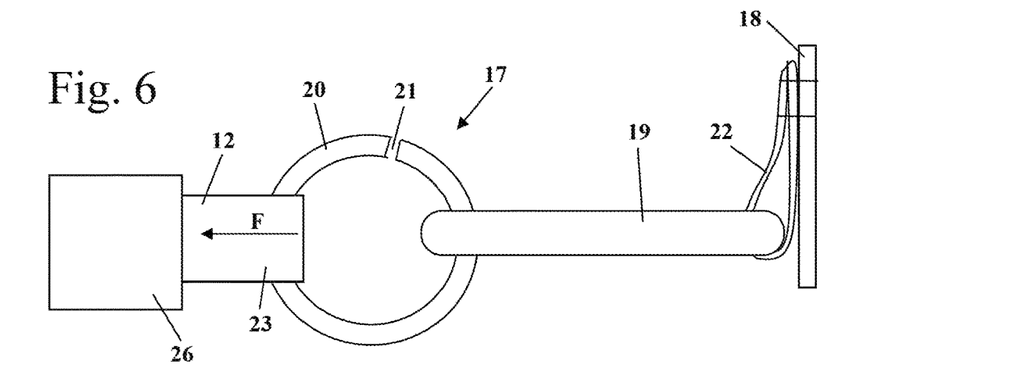
FIG. 6 is a schematic illustration of the connecting device of the cable assembly for connecting the cable assembly to the operator.

FIG. 6 shows the overload ring 20 schematically. The ends of the overload ring 20 are not connected to each other so that the overload ring 20 has an opening 21. In the schematic illustration of FIG. 6, the overload ring 20 extends across less than a full circle circumference. However, it can also be provided that the overload ring 20 extends about an angle of significantly more than 360° about the center point of the ring and that the ends of the overload ring 20 are arranged in an overlapping position. Since the ends of the overload ring 20 are not fixedly connected to each other, the overload ring 20 can expand when exposed to forces. The overload ring 20 is hooked in the carabiner 19 which, in turn, is securely held by a loop 22 on the carrying belt 18. The loop 22 can be, for example, sewn fixedly onto the carrying belt 18 or can be fixedly attached in any other suitable way to the carrying belt 18.

The overload ring 20 is embodied for a maximum pulling force acting on the securing element 12. The maximum pulling force can be, for example, approximately 300 N to approximately 500 N. When a pulling force F that is acting on the securing element 12 surpasses the maximum pulling force of the overload ring 20, the overload ring 20 is expanded and the mechanical connection between the securing element 12 and the carabiner 19, i.e., the operator 2, is released. This can be the case, for example, when the operator 2 transports the power saw 3 suspended from the cable assembly 11 and the power saw 3 gets caught or jammed in the tree or in branches. In this case, the mechanical connection between the securing element 12 and the carabiner 19 separates. The cable assembly 11 is still connected by the power cable 10 and the electrical connections at the ends 14 and 15 of the power cable 10 to the operator 2 even after separation of the mechanical connection provided through the securing element 12. In order to ensure that the connection through the power cable 10 is separated, the pull-out force of the electrical connection 16 is matched to the maximum pulling force of the overload ring 20. The pull-out force for releasing the electrical connection is in this context smaller than the maximum pulling force. As soon as the mechanical connection between the securing element 12 and the carabiner 19 releases or separates due to surpassing the maximum pulling force, the maximum pulling force acts on the electrical connection 16.

The connection 37 between the securing element 12 and the first plug 24 (FIG. 5) ensures in this context that the entire pulling force F that is acting on the securing element 12 is acting immediately on the plug 24 and not on the power cable 10. However, the connection 37 can be omitted. In this case, the electrical connection 16 can also be separated between the power cable 10 and the plug 24. For this purpose, the pull-out force which is required for pulling the power cable 10 from the plug 24 is smaller than the maximum pulling force. As soon as the electrical connection 16 is separated, the power saw 3 is completely detached from the operator 2 and the operator 2 can move independent of the power saw 3.

The pull-out force of the electrical connection 16 advantageously amounts to at most half, in particular at most one fifth, of the maximum pulling force of the overload ring 20. As soon as the mechanical connection between securing element 12 and carabiner 19 has separated, a force is then acting on the electrical connection 16 and this force is significantly greater than the pull-out force so that the electrical connection 16 is reliably released. The pull-out force of the electrical connection 16 can be, for example, 10 N to 250 N, advantageously 20 N to 100 N, in particular approximately 40 N to approximately 60 N.

Figure 7:
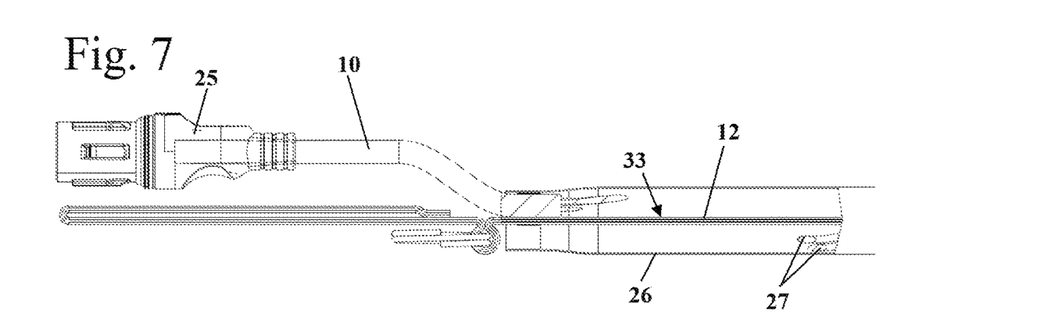
FIG. 7 is an enlarged partially sectioned illustration of the end of the cable assembly to be secured on the power saw in the completely expanded state.

As is shown in the enlarged illustration of FIG. 7, the leads 27 of the power cable 10 even in the completely stretched state of the securing element 12, i.e., at maximum length b of the securing element 12, are still loosely wound about the securing element 12. The length of the power cable 10 is greater than the length of the securing element 12.

Figure 8:
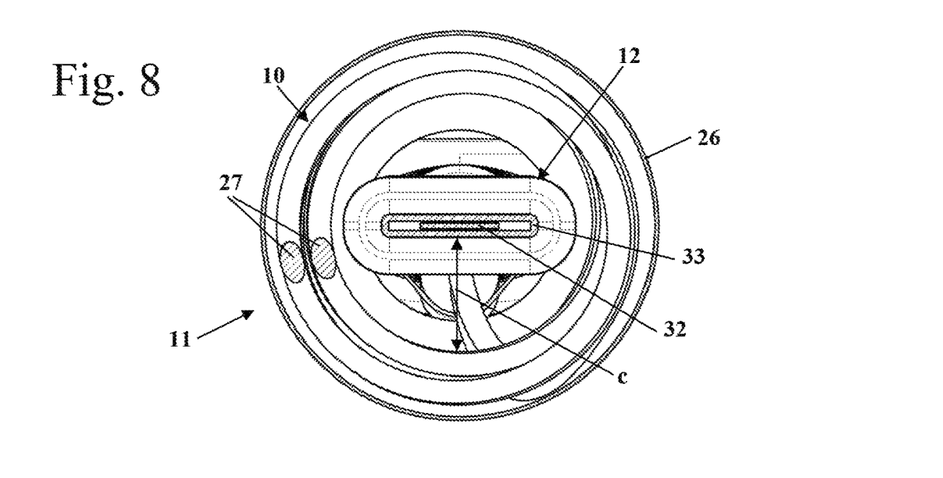
FIG. 8 is a section view along the section line VIII-VIII of FIG. 2.

The section illustration of FIG. 8 shows the configuration of the cable assembly 11 in detail. The sheath 26 surrounds the power cable 10 with its two leads 27 as well as the securing element 12. In the embodiment, the securing element 12 is comprised of two components, i.e., an inner elastic band or strap 32, for example, a rubber band or strap, as well as a length limitation device 33 which surrounds the elastic strap 32. The length limitation device 33 can be, for example, a fabric or plastic hose and, as illustrated in FIG. 4, is folded in the unloaded state of the cable assembly 11. As is shown in FIG. 7, the length limitation device 33 is smooth or flat in the completely expanded state of the securing element 12. The number and size of the folds determines the realizable expansion. In the completely expanded state, the length limitation device 33 cannot be further expanded at the forces that are usually acting in operation and therefore limits the maximum expanded length b of the securing element.

As is shown also in FIG. 8, the securing element 12 has a comparatively minimal spacing c relative to the power cable 10. The spacing c advantageously amounts to less than 15 cm, preferably less than 10 cm, at any location of the cable assembly 11. Particularly preferred is a spacing of less than 5 cm. The outer diameter of the cable assembly 11 can thus be selected to be comparatively small and preferably amounts to less than 10 cm. In the embodiment, the power cable 10 and the securing element 12 are connected to each other approximately across their entire length. The securing element 12 extends from the fastening means 13 to the connecting device 17 completely within the sheath 26. The ends 14 and 15 of the power cable 10 project with a minimal section length of the power cable 10 from the sheath 26 in order to enable a simple connection of the plugs 24 and 25 to the corresponding counter plugs of the power saw 3 or the battery 9.

Figure 9:
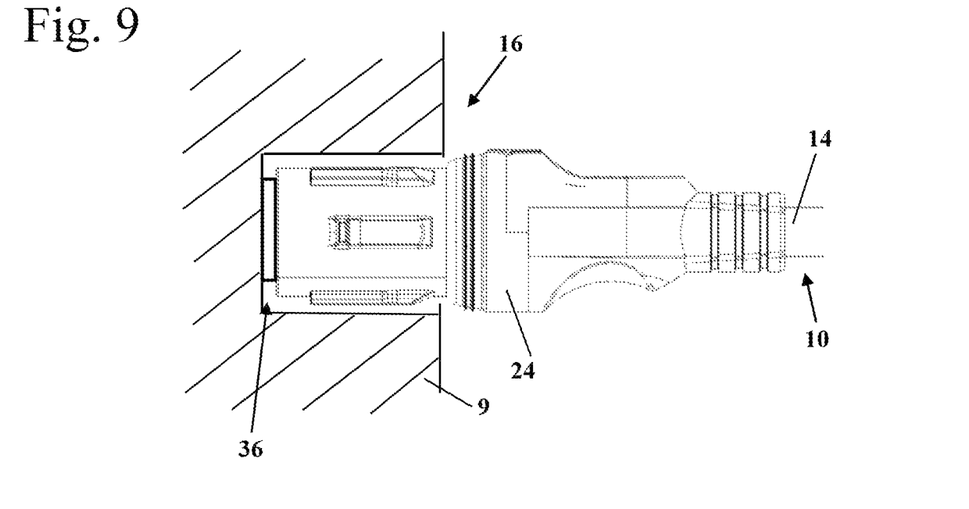
FIG. 9 is a schematic section illustration of the electrical connection between the power cable and the battery.

FIG. 9 shows schematically the electrical connection 16. The battery 9 comprises a counter plug 36 relative to the plug 24; in the embodiment the counter plug 36 is designed as a socket into which the first plug 24 is to be inserted. Advantageously, the overload protection can be integrated into the first plug 24.

Figure 10:
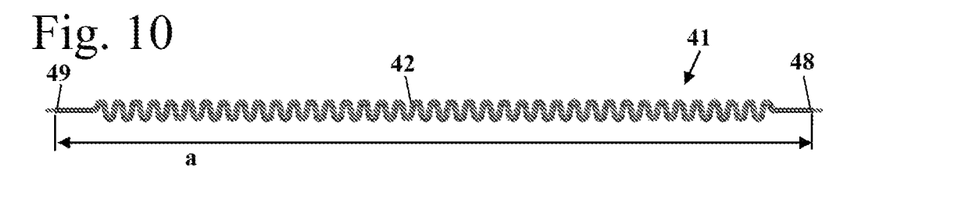
FIG. 10 is a side view of a section of an embodiment of a cable assembly in the unloaded state.
Figures 11, 12:
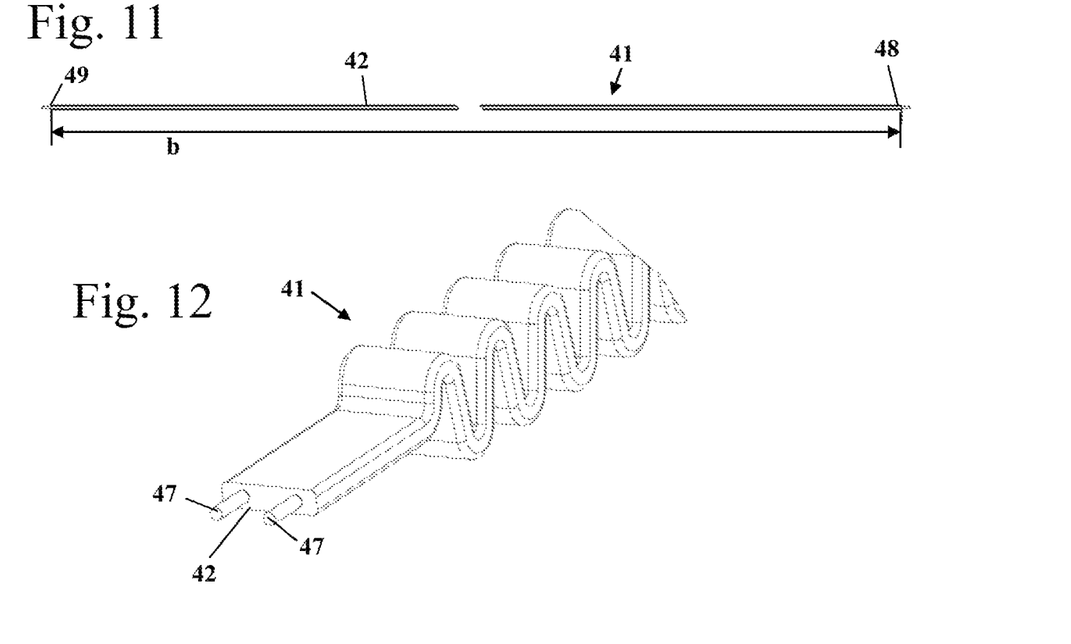
FIG. 11 is the arrangement of FIG. 10 in the completely expanded state.
FIG. 12 is a perspective detail illustration of the cable assembly of FIG. 10.
Figure 13:
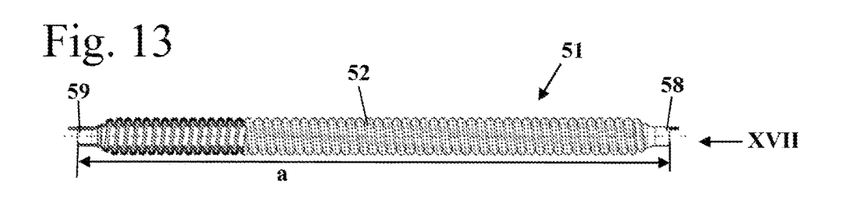
FIG. 13 is a partially sectioned side view of a section of an embodiment of a cable assembly in the unloaded state.
Figure 14:
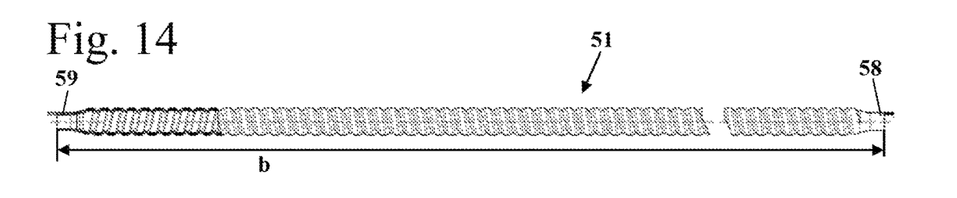
FIG. 14 is a partially sectioned side view of the arrangement of FIG. 13 in the completely expanded state.
Figure 15:
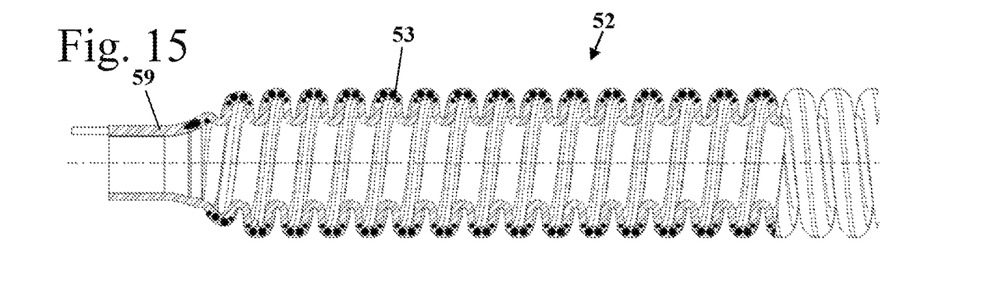
FIG. 15 is an enlarged partially sectioned illustration of an end of the cable assembly of FIG. 13 in the unloaded state.

FIGS. 10 to 12 show an embodiment of a cable assembly 41 in which the leads 47 of the power cable 10 are integrated into a securing element 42. The securing element 42 is formed of a flexible plastic material or a plastic material that is shaped to be elastic; as shown in FIG. 12, the plastic material in the embodiment is of a massive or solid configuration and the leads 47 of the power cable 10 are embedded in the plastic material. In the embodiment, the leads 47 are embedded without a common cable jacket in the material of the securing element 42. The securing element 42 can be comprised, for example, of a plastic material that can be shaped when heated and that is of a wavy configuration when it is not expanded, as shown in FIG. 10. In this state, the securing element 42 has a length a which is measured from a first end section 48 to a second end section 49 of the securing element 42. In the end sections 48 and 49, the fastening means 13, not illustrated in FIGS. 10 through 12, and the connecting device 17 (FIG. 3), not shown in FIGS. 10 to 12, are arranged.

FIG. 11 shows the securing element 42 in the completely expanded state. In this state, the securing element 42 has a length b measured from the first end section 48 to the second end section 49, the length b amounting advantageously to at least 150%, in particular at least 160%, of the length a. In the embodiment, the securing element 42 in the completely expanded state has no longer a wavy configuration but is smooth or flat. The securing element 42 represents in the completely expanded state a length limitation device because the securing element 42 cannot be expanded any further. The securing element 42 can also be a strap of fabric or the like.

Figure 16:
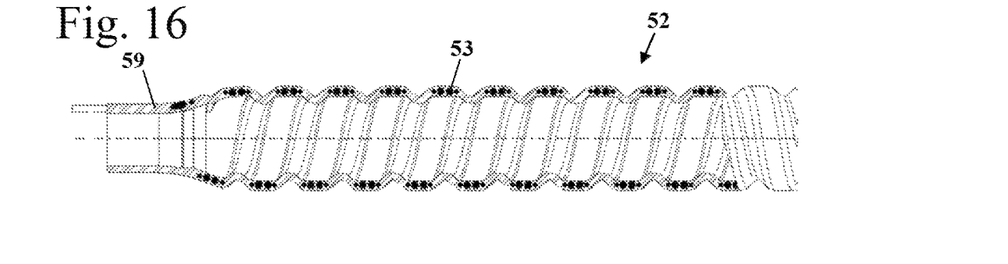
FIG. 16 is an enlarged partially sectioned illustration of an end of the cable assembly of FIG. 13 in the completely expanded state.

FIGS. 13 to 18 show an embodiment of a cable assembly 51 with a securing element 52. Here, the fastening means 13 and the connecting device 17 are not shown. The securing element 52 comprises a first end section 58 and a second end section 59 where the fastening means 13, not shown, or the connecting device 17, not shown, is arranged. In the non-expanded state, the securing element has a length a. The securing element 52 is configured in a tubular shape like a spiral coiled tube and comprises a spirally circumferentially extending bulge 53 which is visible in the non-expended state (FIG. 15) as well as in the completely expanded state of the securing element 52 (FIG. 16). The securing element 52 can be designed such that it cannot be expanded past the expanded state illustrated in FIGS. 15 and 16 and, in this way, constitutes a length limitation device. However, an additional length limitation device, for example, in the form of a cable which is guided through the securing element 52, may be provided also.

Figure 17:
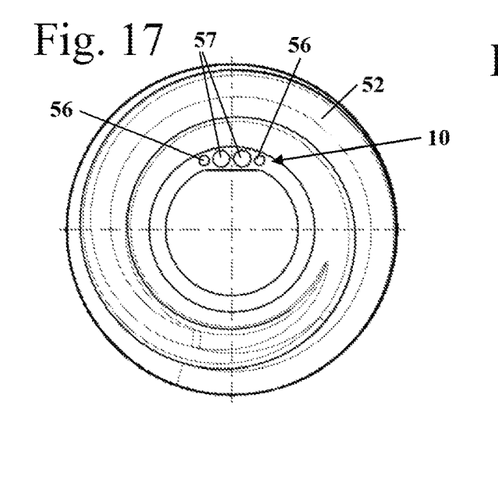
FIG. 17 is a view in the direction of arrow XVII of FIG. 13.
Figure 18:
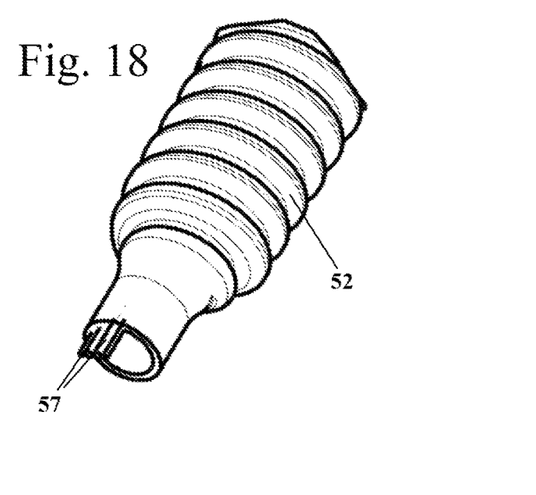
FIG. 18 is a perspective illustration of an end of the cable assembly.
Figure 19:
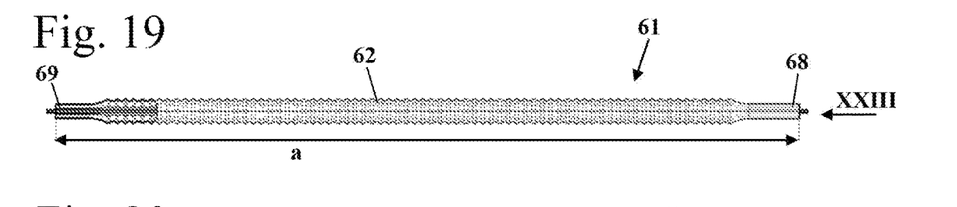
FIG. 19 is a partially sectioned side view of a section of an embodiment of a cable assembly in unloaded state.

As is shown in FIGS. 17 and 18, the power cable 10 that in the embodiment comprises two leads 57 as well as two signal lines 56 is guided in the wall of the securing element 52. The leads 57 and the signal lines 56 are guided individually, without a common cable jacket, in the material of the securing element 52. The securing element 52 can be comprised, for example, of plastic material.

Figure 20:
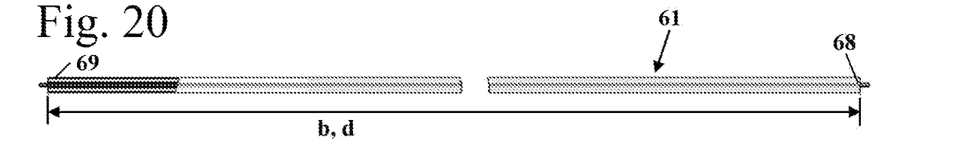
FIG. 20 is a partially sectioned side view of the arrangement of FIG. 19 in completely expanded state.
Figure 21:
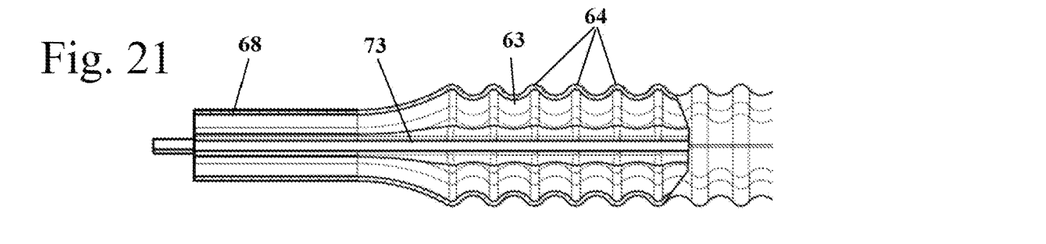
FIG. 21 is an enlarged partially sectioned side view of an end of the cable assembly of FIG. 19 in unloaded state.
Figure 22:
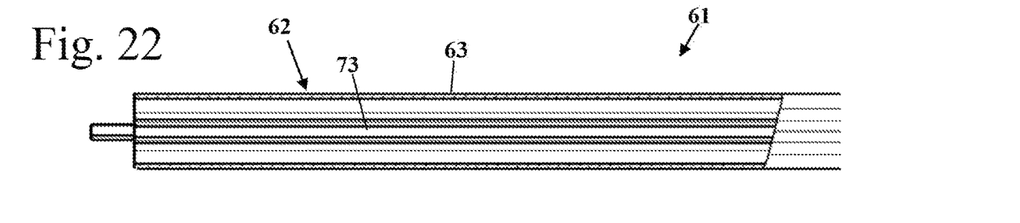
FIG. 22 is an enlarged partially sectioned side view of an end of the cable assembly of FIG. 19 in completely expanded state.
Figure 23:
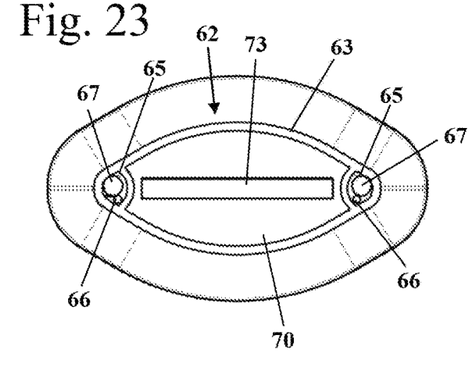
FIG. 23 is a view in the direction of arrow XXIII of FIG. 19.
Figure 24:
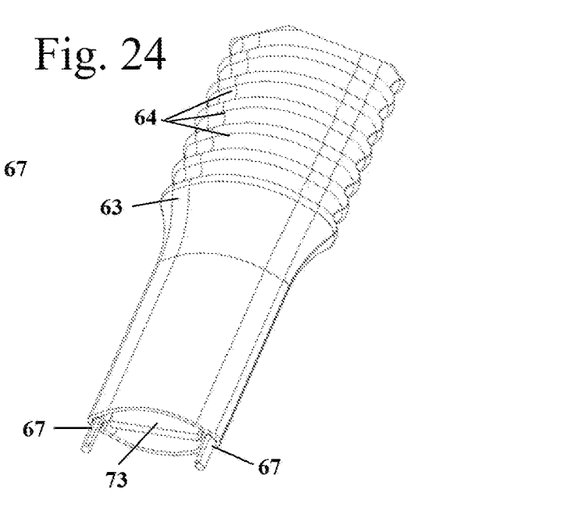
FIG. 24 is a perspective illustration of an end of the cable assembly of FIG. 19.

FIGS. 19 to 24 show a further embodiment of a cable assembly 61. The cable assembly 61 comprises a first end section 68 and a second end section 69 where the fastening means 13 and the connecting device 17 are to be secured. In the non-expanded state, the cable assembly 61 has a length a. The cable assembly 61 comprises a securing element 62 that comprises a hose-shaped sheath 63 in which a spring element 73 is guided. The sheath 63 comprises a plurality of folds 64 and is therefore expandable in its length direction. The spring element 73, as is shown in FIGS. 23 and 24, is of a flat configuration and can be, for example, a rubber band or strap or the like. The spring element 73 as a result of its material is elastic and effects contraction of the cable assembly 61 when the force that is acting on the cable assembly 61 is reduced. As shown in FIGS. 20 and 22, the sheath 63 of the securing element 62 in the completely expanded state is of a smooth or flat configuration. However, it can also be provided that the sheath 63 comprises folds even in the completely expanded state. In the completely expanded state, the securing element 62 has a length b measured from its first end section 68 to its second end section 69.

As is shown in FIGS. 23 and 24, leads 67 and signal lines 66 of a power cable 10, without an enclosing common cable jacket, are guided in the sheath 63. In the embodiment, the sheath 63 is configured to be flat with approximately oval cross-section or flattened circular cross-section wherein, on the narrow sides, pockets 65 are provided in which a signal line 66 and a lead 67 of the power cable 10 are guided, respectively. The spring element 63 is guided in the intermediately positioned space 70 which is separate from the pockets 65. The pockets 65 can also be omitted and the leads 67 and the signal lines 66 can be guided together with the spring element 63 in the space 70. The sheath 63 of the securing element 62 forms a length limitation device for the cable assembly 61. The sheath 63 can be, for example, a textile hose strap. The power cable 10 with the leads 67 and the signal lines 66 has a length d which is shown in FIG. 20 and which, extending from the first end section 68 to the second end section 69, corresponds to the length b of the securing element 62 and of the cable assembly 61. Accordingly, the power cable 10 for maximally tensioned securing element 62 is not expanded in regard to its length. The length d may also be greater than the length b.

Figure 25:
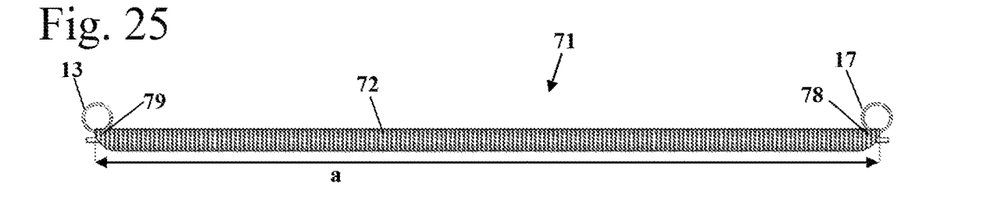
FIG. 25 is an embodiment of a section of a cable assembly in a side view.
Figure 26:
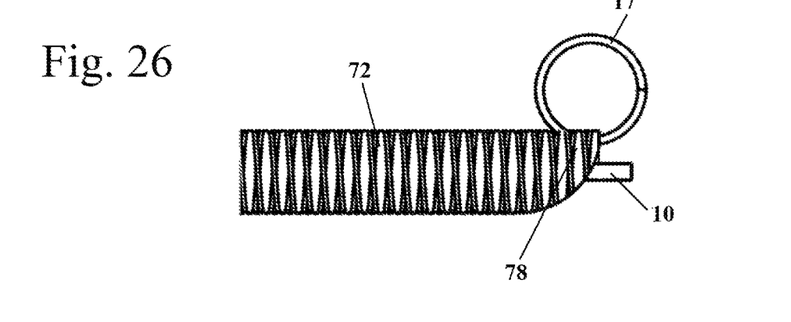
FIG. 26 shows an end of the cable assembly of FIG. 25 in an enlarged illustration.
Figure 27:
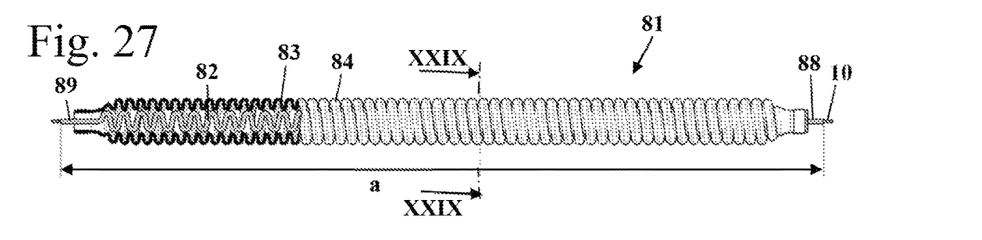
FIG. 27 is a partially sectioned side view of an embodiment of a cable assembly in the unloaded state.
Figure 28:
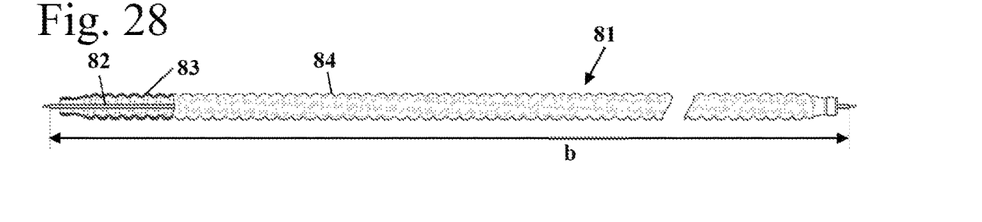
FIG. 28 is a partially sectioned side view of the arrangement of FIG. 27 in a completely expanded state.
Figure 29:
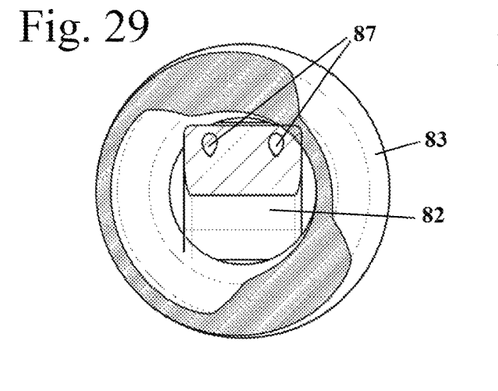
FIG. 29 is a section view along the section line XXIX-XXIX in FIG. 27.
Figure 30:
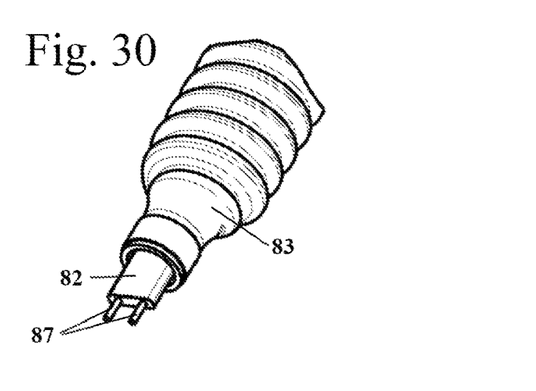
FIG. 30 is a perspective illustration of an end of the cable assembly of FIG. 27.

FIGS. 25 and 26 show an embodiment of a cable assembly 71 which comprises a securing element 72. The securing element 72 is designed as a fabric hose or tube having at its first end section 78 a connecting device 17 and at its second and section 79 a fastening means 13. The power cable 10 extends through the securing element 72. The length limitation device is provided by the copper leads of the power cable 10. However, it can also be provided that the securing element 72 provides a length limitation as a result of its woven structure. In the completely expanded state, the securing element 72 can snuggly rest on the outer circumference of the power cable 10. However, it can also be provided that a spacing is provided between the power cable 10 and the securing element 72. The securing element 72 is elastically embodied and will substantially return to its initial length when no force is acting anymore on the securing element 72.

FIGS. 27 to 30 show an embodiment of a cable assembly 81 which comprises a sheath 83 through which a securing element 82 extends. The sheath 83 is tubular and has a spiral bulge 84 which enables length expansion of the sheath 83. The sheath 83 can be made, for example, of plastic material. The elasticity can be the result of the bulge 84 or can be due to the elasticity of the material. In the unloaded state illustrated in FIG. 27, the securing element 82 is of a wavy configuration and can be comprised, for example, of a plastic material that can be shaped when heated. The securing element 82 corresponds advantageously to the securing element 42 (FIG. 10). In the securing element 82 two leads 87 of the power cable 10 are embedded and are completely enveloped by the material of the securing element 82. In the stretched state of the cable assembly 81 illustrated in FIG. 28, the securing element 82 is of a smooth or flat configuration. The securing element 82 can form a length limitation device of the cable assembly 81. However, it can also be provided that the length limitation device is embodied by the sheath 83. A connecting device 17 is to be secured on a first end section 88 of the cable assembly 81 and a fastening means 13 is to be secured on the second end section 89.

Figures 31, 32:
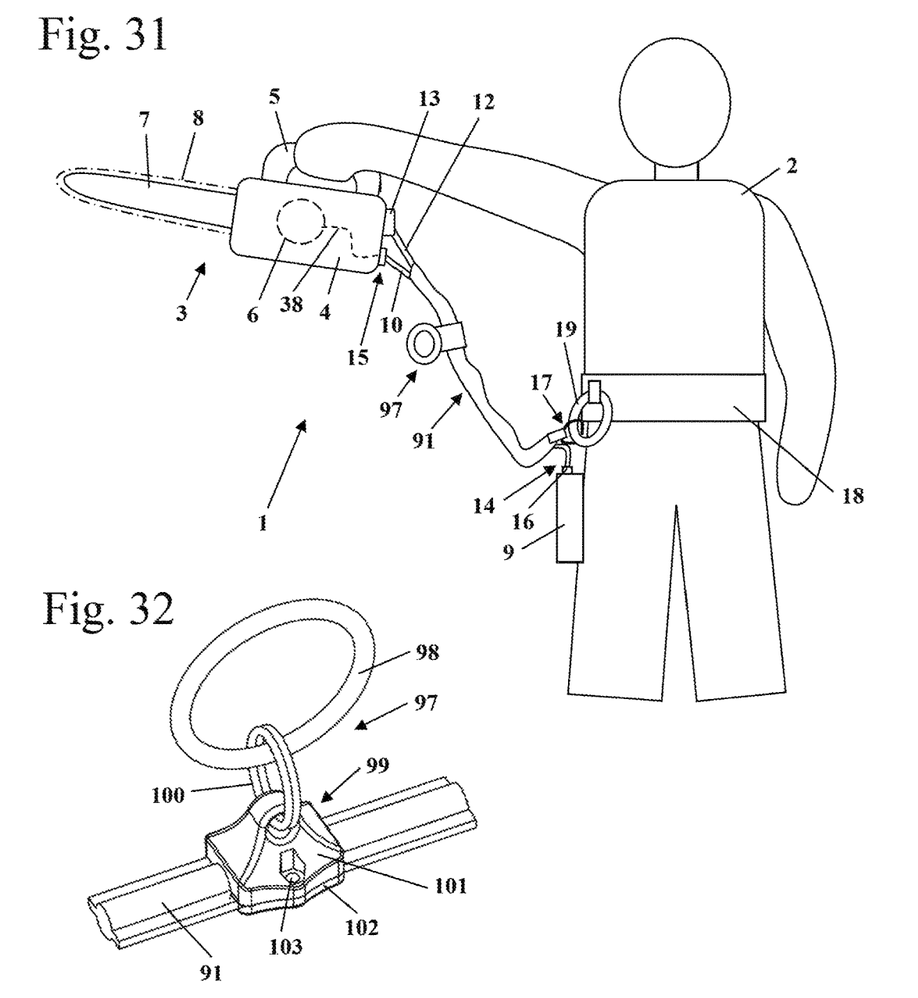
FIG. 31 is a schematic illustration of an embodiment of a power saw system carried by an operator.
FIG. 32 is a perspective illustration of a connecting device of the power saw system of FIG. 31.

FIGS. 31 and 32 show an embodiment of a power saw system 1. The power saw system 1 comprises a cable assembly 91 that connects the power saw 3 to the operator 2. The configuration of the cable assembly 91 may corresponding to the configuration of one of the embodiments of cable assemblies 11, 41, 51, 61, 71, 81 discussed above. On the cable assembly 91 a connecting device 97 is detachably secured. The connecting device 97 can be detached from the cable assembly 91 at least partially and can be secured in different positions on the cable assembly 91. The connecting device 97 of this embodiment is provided in addition to the connecting device 17. However, it can also be provided that only a connecting device 97 which can be secured in different positions on the cable assembly 91 is provided and that no fixed connecting device 17 fixedly secured on the cable assembly is provided.

FIG. 32 shows the configuration of the connecting device 97 in detail. The connecting device 97 comprises a clamping device 99 which is detachably secured on the cable assembly 91. In the embodiment, the clamping device 99 comprises a first clamping shell 101 and a second clamping shell 102 that are connected to each other by means of fastening means 103. The fastening means 103 can be, for example, screws or a quick clamp device. For displacement of the clamping device 99 relative to the cable assembly 91, at least one fastening means 103 is loosened so that the clamping shells 101 and 102 are slidable relative to the cable assembly 91. As soon as the clamping device 99 has reached the desired position, the at least one fastening means 103 is secured again. In the embodiment, as shown in FIG. 32, an overload ring 100 is secured on the first clamping shell 101 and a fastening eye 98 engages the overload ring 100. By means of the fastening eye 98, the connecting device 97 can be secured, for example, on a carabiner 19 of the carrying belt 18.

It can also be provided that the connecting device 97 has no overload ring 100. In this case, the connecting device 97 is provided only for transport of the power saw 3 and not for use in operation of the power saw 3.

Figure 33:
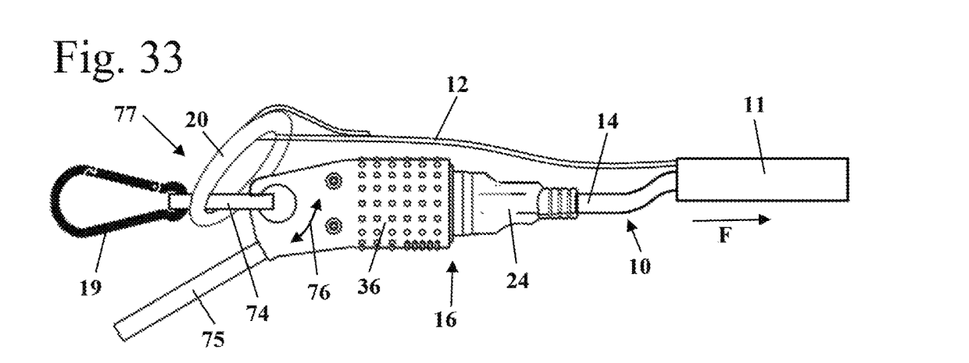
FIG. 33 is a side view of an embodiment of the end of the cable assembly to be secured on the operator.

FIG. 33 shows an embodiment of a connecting device 77 for connecting the cable assembly 11 to the operator. In this context, same reference characters indicate same elements in all of the Figures. The connecting device 77 comprises an overload ring 20 which is connected to the securing element 12. The overload ring 20 is secured in a ring 74 on which also the counter plug 36 is secured so as to be movable to a limited extent, as indicated by double arrow 76 in FIG. 33. The ring 74 is hooked in the carabiner 19 of the operator 2. The electrical connection 16 is designed as a plug connection and is formed by the first plug 24 inserted into the counter plug 36. Due to the fixation of the counter plug 36 on the ring 74 with minimal movability, the counter plug 36 can align itself in the direction of a pulling force F acting on the power cable 10 and on the cable assembly 11. The arrangement of the overload ring 20 on the electrical connection 16 provides for a simple compact configuration. Here, the overload ring 20 is also designed such that the overload ring 20, when a maximum pulling force F is surpassed, is opened and the mechanical connection between carabiner 19 and the securing element 12 is separated. The pull-out force of the electrical connection 16 is smaller than the maximum pulling force so that the electrical connection 16 will become separated immediately after release of the connecting device 77. The counter plug 36 is connected by a connecting cable 75 with the battery 9. Accordingly, an arrangement of the counter plug 36 with limited movability is enabled in a simple way.

The specification incorporates by reference the entire disclosure of European priority document 14 003 913.2 having a filing date of Nov. 20, 2014.

While specific embodiments of the invention have been shown and described in detail to illustrate the inventive principles, it will be understood that the invention may be embodied otherwise without departing from such principles.

What is claimed is:

1. A power saw system comprising:
   a power saw comprising a housing; a guide bar connected to the housing;
   an electric drive motor arranged inside the housing; a saw chain arranged about the guide bar and operatively connected with the electric drive motor so as to be driven in circulation about the guide bar;
   a battery arranged outside of the housing of the power saw;
   a power cable comprising a first end and a second end, wherein the power cable is connected with the first end through an electrical connection to the battery and is connected with the second end to the drive motor, wherein the battery supplies the drive motor with electric power through the power cable;
   an elastic securing element connected by at least one fastening means to the housing of the power saw;
   at least one connecting device configured to connect the elastic securing element to an operator of the power saw;

wherein the at least one connecting device comprises an overload protection characterized by a maximum pulling force, wherein the overload protection is configured to separate the elastic securing element and the operator when a pulling force acting on the elastic securing element surpasses the maximum pulling force of the overload protection;

wherein the elastic securing element and the power cable together form a cable assembly;

wherein a pull-out force for separating the electrical connection is smaller than the maximum pulling force;

wherein the elastic securing element and the operator are separated by the overload protection when the pulling force acting on the elastic securing element is greater than the maximum pulling force and wherein the pulling force, after the elastic securing element and the operator have been separated, acts on the electrical connection between the power cable and the battery and separates the electrical connection because the pull-out force for separating the electrical connection is smaller than the maximum pulling force.

2. The power saw system according to claim 1, wherein the pull-out force of the electrical connection amounts to at most half of the maximum pulling force.

3. The power saw system according to claim 1, wherein the cable assembly comprises means for connecting the power cable and the elastic securing element to each other.

4. The power saw system according to claim 3, wherein the power cable is fastened to the elastic securing element adjacent to the at least one fastening means.

5. The power saw system according to claim 3, wherein the power cable is fastened to the elastic securing element adjacent to the at least one connecting device.

6. The power saw system according to claim 1, wherein the at least one connecting device is configured to be secured on the cable assembly in at least two positions.

7. The power saw system according to claim 1, wherein the power cable is connected at least loosely to the elastic securing element across a connecting length that amounts to at least 50% of a length of the elastic securing element, measured between the at least one fastening means and the at least one connecting device, so that a spacing between the elastic securing element and the power cable in all areas across the elastic securing element is smaller than 15 cm.

8. The power saw system according to claim 7, wherein the power cable is wound about the elastic securing element across the connecting length.

9. The power saw system according to claim 7, wherein the power cable is guided within the elastic securing element across the connecting length.

10. The power saw system according to claim 1, wherein the cable assembly comprises a sheath in which the elastic securing element and the power cable are guided across at least a portion of their respective length.

11. The power saw system according to claim 10, wherein the sheath extends from the at least one fastening means all the way to the at least one connecting device.

12. The power saw system according to claim 1, wherein the cable assembly comprises a length limitation device that limits an expansion of the elastic securing element to a maximum expanded length of the elastic securing element.

13. The power saw system according to claim 12, wherein a length of the power cable is at least as long as the maximum expanded length of the elastic securing element.

14. The power saw system according to claim 1, wherein the electrical connection is a plug connection, wherein the first end of the power cable comprises a plug of the plug connection that is electrically connected to a counter plug of the plug connection provided at the battery.

15. The power saw according to claim 14, wherein the counter plug is designed to be movable to a limited extent so as to align itself in a direction of the pull-out force acting on the power cable.

16. The power saw system according to claim 14, wherein the plug of the plug connection at the first end of the power cable is connected fixedly with a length limitation device of the elastic securing element that limits an expansion of the elastic securing element to a maximum expanded length of the elastic securing element.

17. A power saw system comprising:
a power saw comprising a housing; a guide bar connected to the housing; an electric drive motor arranged inside the housing; a saw chain arranged about the guide bar and operatively connected with the electric drive motor so as to be driven in circulation about the guide bar;
a battery arranged outside of the housing of the power saw;
a power cable comprising a first end and a second end, wherein the power cable is connected with the first end through an electrical connection to the battery and is connected with the second end to the drive motor, wherein the battery supplies the drive motor with electric power through the power cable;
an elastic securing element connected by at least one fastening means to the housing of the power saw;
at least one connecting device configured to connect the elastic securing element to an operator of the power saw;
wherein the at least one connecting device comprises an overload protection characterized by a maximum pulling force, wherein the overload protection is configured to separate the elastic securing element and the operator when a pulling force acting on the elastic securing element surpasses the maximum pulling force of the overload protection;
wherein the elastic securing element and the power cable together form a cable assembly;
wherein a pull-out force for separating the electrical connection is smaller than the maximum pulling force;
wherein the elastic securing element and the operator are separated by the overload protection when the pulling force acting on the elastic securing element is greater than the maximum pulling force and wherein the pulling force, after the elastic securing element and the operator have been separated, acts on the electrical connection between the power cable and the battery and separates the electrical connection because the pull-out force for separating the electrical connection is smaller than the maximum pulling force;
wherein the cable assembly comprises a length limitation device that limits an expansion of the elastic securing element to a maximum expanded length of the elastic securing element;
wherein the maximum expanded length of the elastic securing element measured between the at least one fastening means and the at least one connecting device amounts to at least 150% of an unloaded length of the elastic securing element measured between the at least one fastening means and the at least one connecting device.

18. A cable assembly for a power saw comprising:
an elastic securing element;
a power cable;

at least one fastening means configured to secure the elastic securing element on a housing of the power saw;

at least one connecting device configured to connect the cable assembly to an operator of the power saw;

wherein the at least one connecting device comprises an overload protection characterized by a maximum pulling force, wherein the overload protection is configured to separate the elastic securing element and the operator of the power saw when a pulling force acting on the elastic securing element surpasses the maximum pulling force of the overload protection;

wherein the power cable comprises a plug of an electrical connection and wherein a pull-out force for separating the electrical connection is smaller than the maximum pulling force;

wherein the elastic securing element and the operator are separated by the overload protection when the pulling force acting on the elastic securing element is greater than the maximum pulling force and wherein the pulling force, after the elastic securing element and the operator have been separated, acts on the electrical connection between the power cable and the battery and separates the electrical connection because the pull-out force for separating the electrical connection is smaller than the maximum pulling force.

19. A power saw system comprising:

a power saw comprising a housing; a guide bar connected to the housing; an electric drive motor arranged inside the housing; a saw chain arranged about the guide bar and operatively connected with the electric drive motor so as to be driven in circulation about the guide bar;

a battery arranged outside of the housing of the power saw;

a power cable comprising a first end and a second end, wherein the power cable is connected with the first end through an electrical connection to the battery and is connected with the second end to the drive motor, wherein the battery supplies the drive motor with electric power through the power cable;

an elastic securing element connected by at least one fastening means to the housing of the power saw;

at least one connecting device configured to connect the elastic securing element to an operator of the power saw;

wherein the at least one connecting device comprises an overload ring characterized by a maximum pulling force, wherein the overload ring comprises ends that are not connected to each other, wherein the overload ring is configured to expand and separate the elastic securing element and the operator when a force acting on the elastic securing element surpasses the maximum pulling force of the overload ring;

wherein the elastic securing element and the power cable together form a cable assembly;

wherein a pull-out force for separating the electrical connection is smaller than the maximum pulling force.

* * * * *